United States Patent

Matsu et al.

[11] Patent Number: 6,088,989
[45] Date of Patent: Jul. 18, 2000

[54] FRAMING MEMBER

[75] Inventors: Yoshitaka Matsu; Shigehisa Maruyama; Tetsufumi Shibata, all of Fukuoka, Japan

[73] Assignee: Ado Supesu Kabusiki Kaisha, Fukuoka, Japan

[21] Appl. No.: 09/091,458

[22] PCT Filed: Dec. 12, 1996

[86] PCT No.: PCT/JP96/03640

§ 371 Date: Sep. 25, 1998

§ 102(e) Date: Sep. 25, 1998

[87] PCT Pub. No.: WO97/22766

PCT Pub. Date: Jun. 26, 1997

[30] Foreign Application Priority Data

Dec. 15, 1995 [JP] Japan ..................................... 7-347641

[51] Int. Cl.[7] .................................. E04B 1/19; E04B 1/38
[52] U.S. Cl. ........................ 52/655.1; 52/36.5; 52/653.1; 52/656.9; 52/702; 52/733.2; 52/736.2; 52/737.2; 52/737.3; 52/745.2
[58] Field of Search ................................ 52/653.1, 650.1, 52/733.2, 36.5, 655.1, 656.9, 702, 736.2, 737.2, 737.3, 745.2; 403/170, 219

[56] References Cited

U.S. PATENT DOCUMENTS

| | | | |
|---|---|---|---|
| 2,733,786 | 2/1956 | Drake | ................................. 52/733.2 X |
| 3,206,903 | 9/1965 | Johnson | ............................... 52/653.1 X |
| 4,285,176 | 8/1981 | Runkle | ................................ 52/653.1 X |
| 5,295,754 | 3/1994 | Kato | ...................................... 52/702 X |
| 5,438,811 | 8/1995 | Goya | ................................... 52/656.9 X |

*Primary Examiner*—Christopher T. Kent
*Attorney, Agent, or Firm*—Flynn, Thiel, Boutell & Tanis, P.C.

[57] ABSTRACT

A frame material that can be easily formed as a pillar or beam by appropriately adjusting the length and/or strength thereof, a joint portion of which is uniform and smooth, a residual portion of which can be used as a joint, and which can easily be combined with other building materials. The frame material is formed into an elongate shape, and a cross section crossing at right angles a longitudinal axis thereof is formed into a rectangular shape with the length of a shorter side of the rectangular cross section being made one-third of the length of a longer side. The frame material comprises in combination a frame material in which a pair of through holes (5,5) are provided at a predetermined pitch on a center line (4) of a front side whose lateral width (w) is constituted by the longer side of the cross section, the hole pitch of the pair of through holes being a half of the lateral width, and a frame material in which a pair of through holes (5, 5) are provided on a line crossing at right angles the center lines at a hole pitch of a half of the lateral width in such a manner as to be symmetric with respect to the center line, and pairs of through holes are provided along the center line (4) at the predetermined pitch. In this case, the pitch of the through holes (5, 5) on the center line may be provided so as to be equal to a module dimension of a building material.

20 Claims, 5 Drawing Sheets

FRAMING MEMBER

TECHNOLOGICAL FIELD

This invention relates to a jointing method of framing members mainly suitable for constructing housing and other structures.

TECHNOLOGICAL BACKGROUND

So far, as framing wooden members in, for example, housing and other structures, what is called "solid shafts" cut out from lumber have been generally available, but recently as much more attention has been paid for the saving of natural resources and overhead costs have increased, it has been very difficult to obtain such members at a reasonable price. Therefore, a various shape of members have been proposed for the market. One of them is formed by solidly securing a plurality of wooden plates facing each other at a certain interval of spacing.

Framing members with such conventional construction are formed by solidly binding both members by adhesives or bolting after the end portion of one framing member is inserted into an opening in the other member.

With the framing members according to the prior art, however, until the connection portions are completely tightened with bolts or solidly fixed with adhesive agent, the connection portions must be temporarily fixed or a delicate positional adjustment of the connection portions must be made, thereby requiring much more labor or tools, thus resulting in an increased cost. In particular when used at a poor scaffolding made of longer materials like house or other building site, the temporary fixing work of the framing members is very dangerous.

To solve the above problems, this invention intends to provide a jointing method of framing members which can easily temporarily fix framing horizontal members to framing columns when building or assembling houses and other constructions.

DISCLOSURE OF THE INVENTION

To achieve the foregoing target, the jointing method of the framing members prepares one piece of framing column which is made by facing two slender members having the same shape of butt end to each other so as to provide a given width of opening; two pieces of framing horizontal members having the same sectional shape as the foregoing framing column; an opening joint fixture for attaching one of the two foregoing framing horizontal members so that the end surface is jointed along the side surface of the opening of the foregoing framing column; and a side joint fixture for attaching the other framing horizontal member so that the end surface is jointed along the side surface at right angle with the side surface of the opening of the foregoing framing column, and joints the framing column and the framing horizontal members by way of the opening joint fixture and the side surface joint fixture so that both framing framing members are placed at right angle with the framing column.

The foregoing opening joint fixture has a width equal to the opening, a fixing surface which fits into the opening of the framing column for attaching and a joint surface projecting from the opening side surface of the framing column. The joint surface has an introduction opening at the top edge, as well as a bolt receiving groove for holding a bolt at the groove bottom and a bolt through hole both disposed respectively at its upper and lower portions.

The foregoing side surface joint fixture has a width equal to the opening, a fixing surface which is attached to the side surface of the framing column and a joint surface projecting from the both sides of the fixing surface. The joint surface has an introduction opening at the top edge, as well as a bolt receiving groove for holding a bolt at the groove bottom and a bolt through hole both disposed respectively at its upper and lower portions.

The end portions of the both foregoing framing horizontal members have respectively a drilled upper bolt through hole and a drilled lower bolt through hole disposed so as to match the groove bottom of the bolt receiving groove and the bolt through hole.

The opening joint fixture and the side surface joint fixture are fixed to the framing column by way of the common fixing bolts, while the fixing surface of the foregoing opening joint fixture is inserted so as to fit into the opening of the framing column and the fixing surface of the side surface joint fixture is pressed against the side of the framing column.

Before fixing the opening joint fixture and the side surface joint fixture, the upper bolts are inserted into the upper bolt through holes of the both foregoing framing horizontal members, for temporary tacking.

In jointing one framing horizontal member to the framing column, while the joint surface of the opening joint fixture is fit into the opening of the framing horizontal member, the upper bolt is dropped down onto the bottom of the bolt receiving groove, so as to temporary fix the framing horizontal member. In jointing the other framing horizontal member to the framing column, while the joint surface of the side surface joint fixture is fit into the opening of the framing horizontal member, the upper bolt is dropped down onto the bottom of the bolt receiving groove, so as to temporarily fix the framing horizontal member.

Finally, the lower bolt is inserted into the lower bolt through hole and the matched bolt through hole of both framing horizontal members for fixing, while the foregoing upper bolt is fixed.

Therefore, previously, the upper bolt should be inserted for tacking only into the upper bolt through holes of the framing horizontal members, and the joint fixtures should be attached to the framing column. When making a joint, while the joint surface of the joint fixture is being inserted into the opening of the framing horizontal members, the upper bolt is dropped down onto the bottom of the bolt receiving groove, so that the upper bolt of the framing horizontal members is introduced into the bolt receiving groove of the joint fixture, to temporarily fix the framing horizontal members to the framing column.

Further, a further embodiment of the jointing method of the framing members joins a framing column and four framing horizontal members by way of the opening joint fixture and the side surface joint fixture, so that each of the four pieces of the framing horizontal members be disposed in cross shape with the framing member. The operation in the joint method of this embodiment is similar to the first embodiment.

PREFERRED EMBODIMENTS

Figure 1:
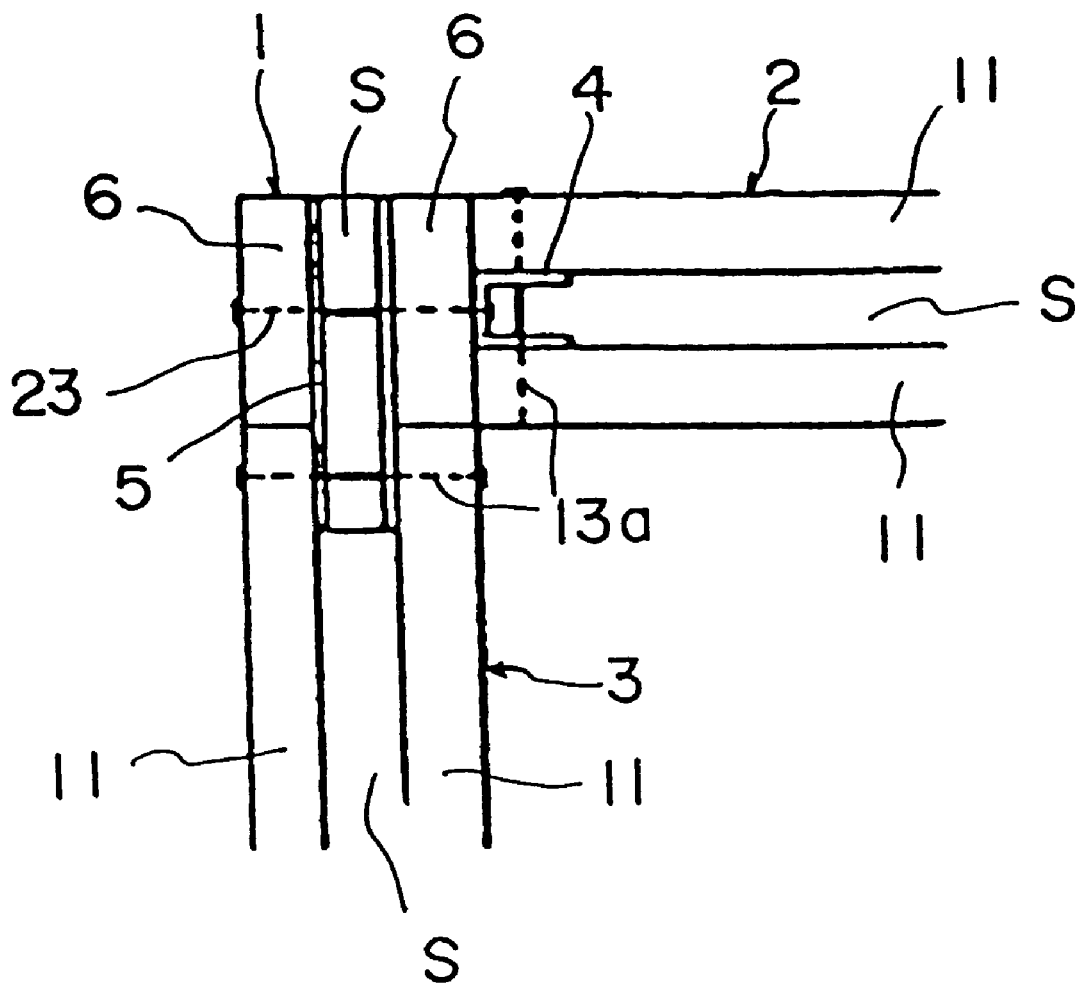
FIG. 1 is an illustration showing a joint structure jointed by the jointing method of the framing members according to of the present invention.

Now, description will be made for embodiments according to the present invention, referring to foregoing drawings:

FIG. 1 is an illustration showing a joint structure jointed by the jointing method of the framing members according to the present invention; In the drawing, Numeral 1 is a framing column; 2 is a front-side (framing) horizontal member; 3 is an end-side (framing) horizontal member; 4 is a front-side (side-surface) joint fixture; and 5 is an end-side (opening) joint fixture.

Figure 2A:
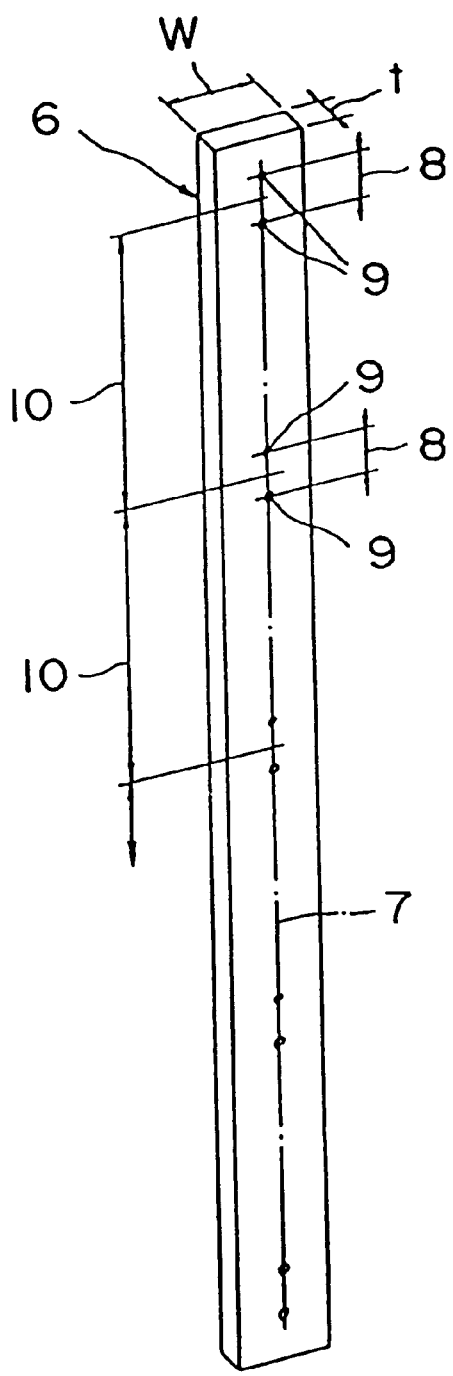
FIGS. 2(a) and 2(b) are respectively perspective views showing slender framing members to be used as (a) a framing column and (b) a framing horizontal member.
Figure 2B:
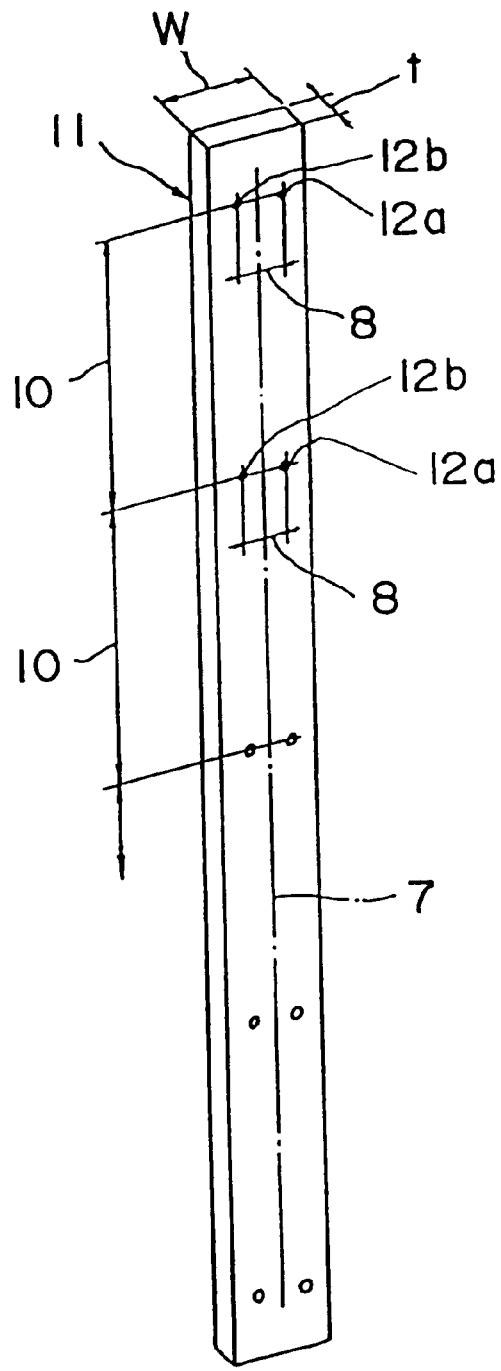

The framing column 1 is a composite substructure of a pair of long-size slender members 6 facing each other. The width w of the slender member 6 is three times the thickness t. The framing member 1 is formed by providing an opening s (s=t) in between the slender members 6, 6. In the lateral (or wider) surfaces of the column 1 (including the top end), a plurality of pairs of through holes 9, 9 for fixing the joint fixtures (fixture fixing through holes 9, 9) with a small pitch or spacing 8 (½ w long) are opened on the longitudinal center line 7 of the slender member 6 at an interval of spacing or with a large pitch equal to the modular size 10 of the construction members (See FIG. 2). In this connection, the foregoing slender member 6 may have one large pitch of, for example, 300 mm equal to the modular size of the construction members (the total length=372 mm), two pitches, three pitches . . . , as far as eight pitches. Further, the modular size also may be, for example, 300 mm, 450 mm, 600 mm, or 900 mm. The thicker the plate thickness of the foregoing slender members 6, the larger the strength, i.e., the longer the slender members. The slender members 6 may be made of solid material or pipe of wood, composite material, synthetic resin, FRP, aluminum, steel and so on.

A composite substructure of the foregoing front-side horizontal member 2 and the foregoing end-side horizontal member 3 is formed as follows: A pair of long-size slender members 11 (plate width w=three times the thickness t) are faced to each other with an opening s (equal to the plate thickness t) provided there between. In the lateral or wider surfaces of the front-side horizontal member 2 and the end-side horizontal member 3 (including the end portion), a plurality of pairs of (upper) and (lower) bolting through holes 12a and 12b are (1) opened at right angles with the longitudinal center line 7 with a small pitch or spacing 8 symmetrically (up and down) to the center line 7, and (2) arranged on the longitudinal center line 7 at a large pitch or spacing 10 (equal to the modular size 10) (See FIG. 2). In this connection, the foregoing slender member 11 may have one large pitch of, for example, 300 mm equal to the modular size of the construction members (the total length= 372 mm), two pitches, three pitches, . . . , as far as ten pitches. Further, the modular size also may be, for example, 300 mm, 450 mm, 600 mm, or 900 mm. Further, before assembling the foregoing horizontal substructure as a framing horizontal member to the foregoing vertical substructure as a framing column, only an upper bolt 13a is inserted into the (end-side) upper bolt through hole 12a, and temporarily tightened with nut via washer. The thicker the plate thickness of the foregoing slender members 11, the larger the strength, i.e., the longer the slender members. The slender members 11 may be made of solid material or pipe of wood, composite material, synthetic resin, FRP, aluminum, steel and so on.

The foregoing end-side joint fixture 5 is used as an opening joint fixture for fitting the end-side horizontal member 3 so that the end surface comes along the side surface of the opening of the foregoing column 1. On the contrary, the foregoing front-side joint fixture 4 is used as a side-surface joint fixture for fitting the front-side horizontal member 2 so that the end surface comes at right angle with the side surface of the opening of the foregoing column 1. Finally, using the front-side joint fixture 4 and the end-side joint fixture 5, the front-side horizontal member 2 and the end-side horizontal member 3 are jointed to the framing column 1 so as to be at right angles with each another.

Figure 3:
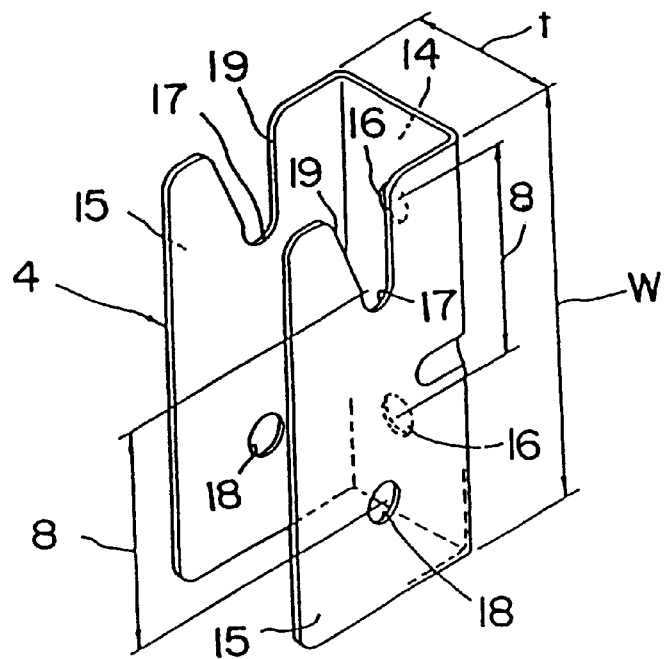
FIG. 3 is a perspective view showing a joint fixture for side surface.

As shown in FIG. 3, the foregoing front-side joint fixture 4 is formed into a fixture essentially like a Japanese katakana letter "ko" comprising (1) a plate having a fixing surface 14 with a width t for another framing member to be connected to a side of the column 1, and (2) two plates having two joint surfaces 15, 15 folded at right angle with and from the fixing surface 14 so as to project out from the side surfaces of the column 1 with a spacing t. In the foregoing fixing plate 14, fixture fixing through holes 16, 16 are opened so as to match the fixture fixing through holes 9, 9 of the column 1.

In order to have a joint with the foregoing front-side horizontal member 2, along the longitudinal center line of the foregoing joint plates 15, 15, bolt receiving grooves 17 and bolt through holes 18 are opened longitudinally up and down with a spacing or a small pitch 8 so as to match the foregoing upper bolt through hole 12a and the lower bolt through hole 12b. An introducing opening 19 is cut in the bolt receiving groove 17 so as to reach the top edge of the joint plate 15.

Figure 4:
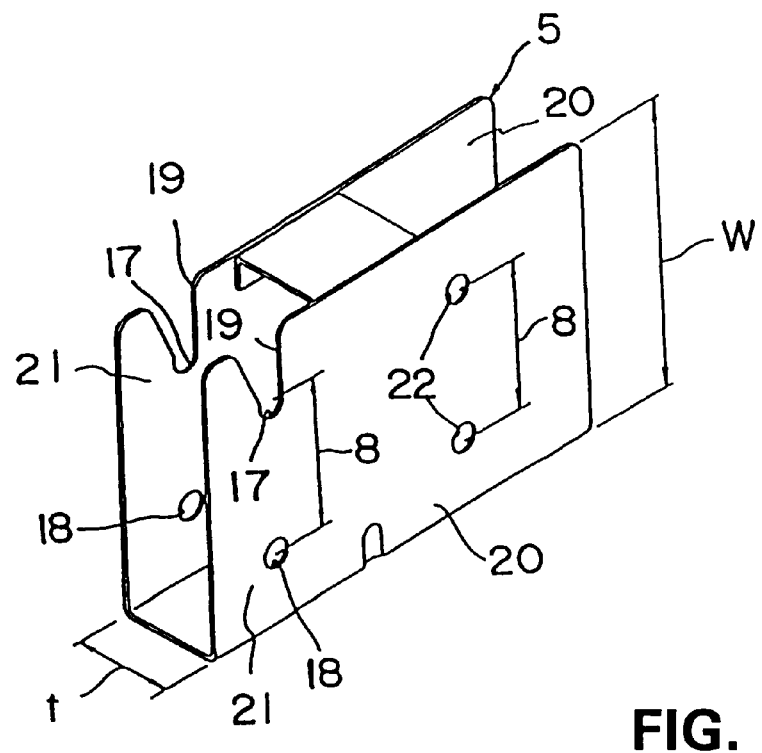
FIG. 4 is a perspective view showing a joint fixture for opening.

As shown in FIG. 4, the foregoing end-side joint fixture 5 is provided with (1) two fixing plates 20, 20 having fixing surfaces with a spacing t to each other so as to be inserted into the opening s in the column 1, and (2) two other fixing plates 21, 21 having fixing surfaces with the spacing t to each other so as to continuously project out one-sideways from the side surface of the opening in the column 1. The fixing plates 20, 20 are connected to each other at their bottom edges so as to form essentially an English letter "U". In the fixing plates 20, 20, fixture fixing through holes 22, 22 are opened so as to match the fixture fixing through holes 9, 9 in the column 1. In the fixing plates 21, 21, formed are bolt receiving grooves 17, introduction holes 19 and bolt through holes 18.

Figure 5:
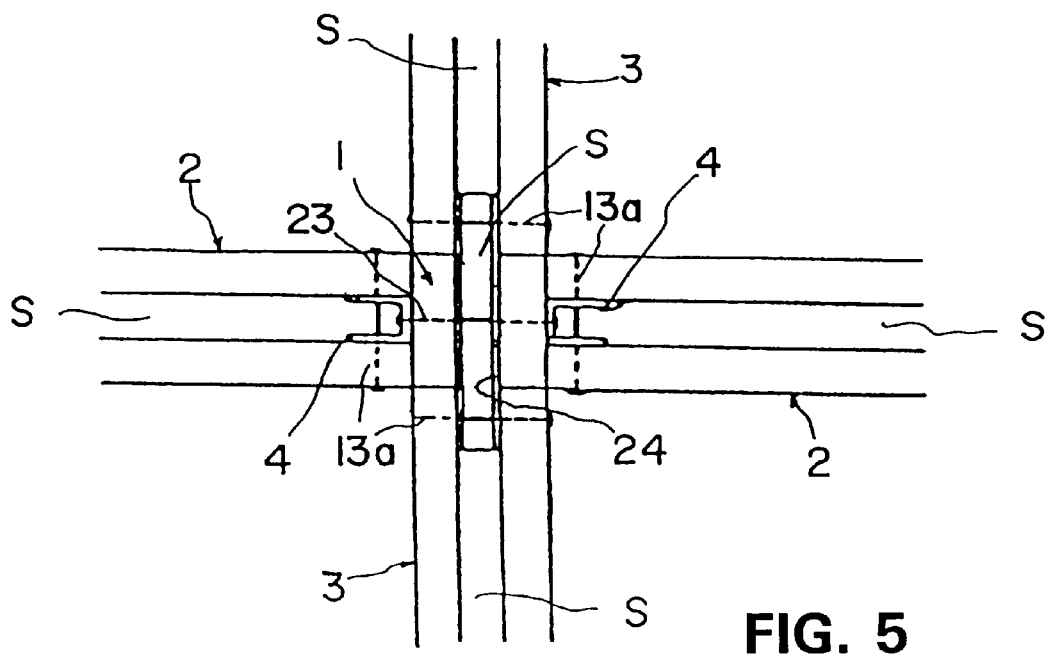
FIG. 5 is an illustration showing a joint structure jointed by the jointing method of the framing members according to a further embodiment of the present invention.

With the foregoing joint fixtures 4, 5 shown in FIGS. 4 and 5, pitches or spacings between the groove bottom axial center of the bolt receiving groove 17 and the bolt through hole 18, as well as between the fixture fixing through holes 22, 22 are set to the same size, and to the same level.

Then, when the fixing surface 14 of the foregoing front-side fixing fixture 4 is pressed against the side surface of the column 1, and when the fixing surfaces 20, 20 of the end-side joint fixture 5 are inserted into the opening s of the column 1, the front-side fixing fixture 4 and the end-side joint fixture 5 both are fixed to the column 1 with common fixing bolts 23, 23.

Now, description will be made for the jointing method of the framing column 1 and the front-side and end-side horizontal members 2, 3 shown in FIG. 1 as follows:

First, the front-side and end-side joint fixtures 4 and 5 are fixed to the top end portion of the column 1 with common fixing bolts 23, 23. As they are fixed, the front-side horizontal member 2 is placed at level, and this end is placed along the side surface of the column 1, while directing upward the head of the upper bolt 13a which has been beforehand inserted into the upper bolt through hole 12a for tacking. The joint surface 15 of the front-side joint fixture 4 is inserted into the opening s of the front-side horizontal member 2, so as to have the front-side joint fixture 4 drop down.

As described above, the upper bolt 13a for the front-side horizontal member 2 is guided down from the introduction opening 19, so as to engage with the lower bolt receiving groove 17. At this time, both positions of the lower bolt through hole 12b located at the lower side of the front-side horizontal member 2 and the bolt through hole 18 at the lower side of the front-side joint fixture 4 agrees with each other, so that the lower bolt 13b is inserted therein and temporarily tightened with nut via washer.

Next, the end-side horizontal member 3 will be jointed to the end-side joint fixture 5 in the column 1 as follows:

In the same way as above, the fixing surface 21 projecting out from the column 1 is inserted into the opening "s" in the end-side horizontal member 3, so as to first engage the upper bolt 13a with the bolt receiving groove 17, and then to insert the lower bolt 13b into the lower bolt through hole 12b for tacking.

Finally, the upper and lower bolts 13a, 13b are fixed to each other.

FIG. 5 is an illustration showing a joint structure jointed by the jointing method of the framing members according to a further embodiment of the present invention: The same construction components as those described in FIG. 1 are attached with the same numerals, thus omitting their own description.

This joint structure comprises (1) one piece of framing column 1; (2) four pieces (in total) of two pieces of front-side horizontal members 2, 2 and two pieces of end-side horizontal members 3, 3 respectively having the same sectional geometry as the one of the column 1; (3) one piece of end-side joint fixture 24 (for jointing the opening) for jointing the end-side horizontal members 3, 3 extending in an identical direction so that the end surfaces come along the both side surfaces of the opening in the column 1; and (4) two pieces of front-side joint fixtures 4, 4 (for jointing the side surfaces) for jointing the front-side horizontal members 2, 2 so that the end surfaces come along the both side surfaces at right angle with the side surface of the opening in the column 1. The horizontal members 2, 2, 3, 3 respectively jointed to the column 1 so that they cross the column 1 totally via the front-side joint fixture 4, 4 and the end-side joint fixture 24.

Figure 6:
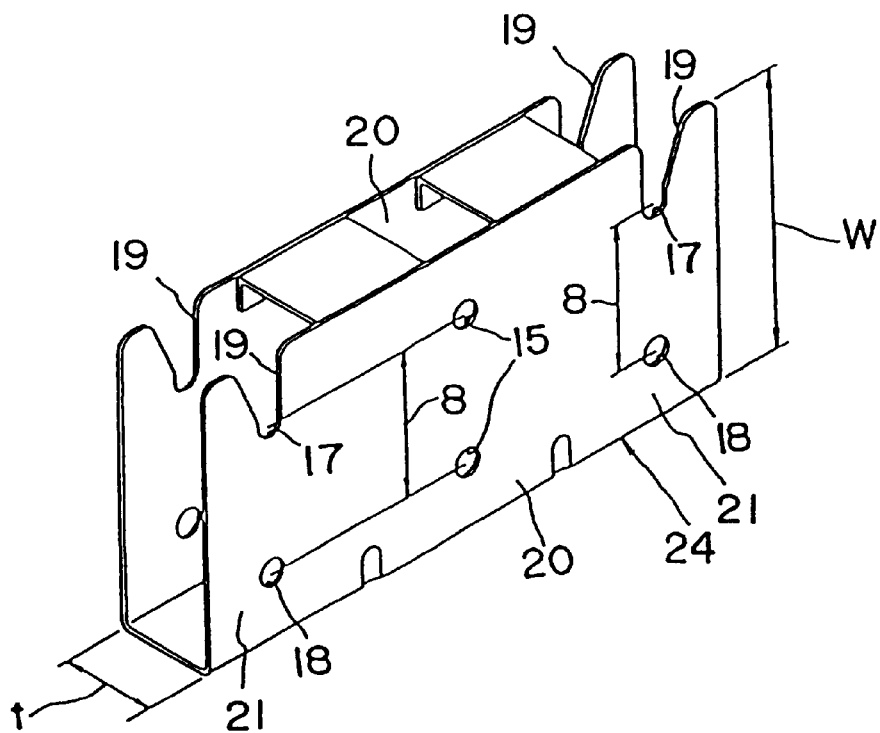
FIG. 6 is a perspective view showing a joint fixture for opening.

As shown in FIG. 6, the foregoing end-side joint fixture 24 has (1) fixing plates 20, 20 (with a spacing t) at the central portion, which can be inserted into the opening "s" in the column 1 for fixing, and (2) joint plates 21, 21 which are formed by extending both-sideways the fixing plates 20, 20 so as to project out in both directions from the side surfaces of the opening in the column 1.

Figure 7:
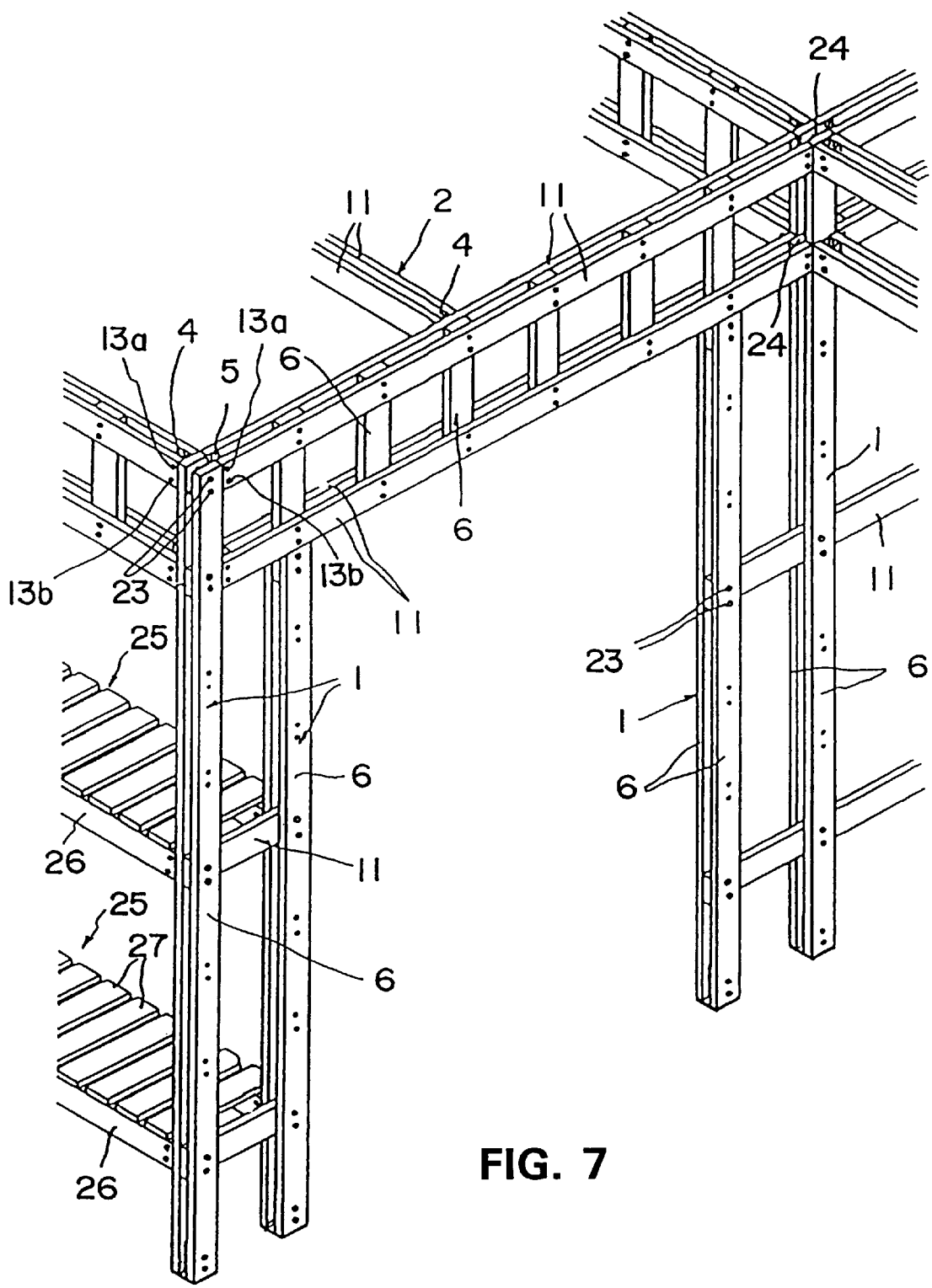
FIG. 7 is a perspective view showing an indoor display rack properly constructed by way of partially using the jointing method of the framing members according to the present invention.

FIG. 7 is a perspective view showing a beautiful wooden indoor display rack properly constructed by way of using a variety of the foregoing jointing methods of the framing members and a variety of the foregoing substrutures according to the present invention.

In FIG. 7, Numeral 25 is a shelf formed by placing slender members 27 (cut out from a horizontal member) on a pair of parallel horizontal members 26, 26 in duck board shape. In this connection, the foregoing horizontal member 26 and slender members 27 are adhered to each other using surface fastener.

Using the above described procedures, housing and others can be constructed in the same way.

So far, a variety of typical embodiments have been described, but possible configurations of the present invention are not limited to those, even if some modifications are applied to the embodiments provided that there be no deviation from the purport of the present invention.

For example, the above embodiments used the joint fixtures made of metal or lumber, but, instead of them, an integrated combination of metal and lumber and FRP may be used.

The above embodiments used the slender member 6 as columns, and the slender member 11 as horizontal members, but the slender member 6 may be used as horizontal members, and the slender member 6 may be used as columns.

In addition to housing constructions and indoor display racks, the jointing methods of the framing members according to the invention can be used for constructing or assembling such housing accessories as benches and clothes-drying balconies; such interior goods as chairs, desks, furniture and two-stage bedding; and such outdoor goods as campstools, planting platforms, decks, gates, fences, pergolas and garages.

INDUSTRIAL AVAILABILITY

As described above in detail, since the jointing method of framing members according to the present invention has the foregoing configuration, the framing horizontal members can be easily fixed temporarily to framing columns when jointing them, so that heavy constructions and multiply-jointed constructions of housing and the like can be easily and safely assembled.

What is claimed is:

1. A frame assembly, comprising:
   a vertically-extending first frame member having side, front and rear surfaces and a first through hole extending through said front and rear surfaces, a first through opening being open through the side surfaces of said vertical frame member;
   a horizontally-extending second elongate frame member having an end surface, top and bottom surfaces, oppositely facing side surfaces and second and third through holes each extending through said side surfaces thereof, a second opening being open through top, bottom and end surfaces of said second frame member;
   a horizontally-extending third elongate frame member having an end surface, top and bottom surfaces, front and rear surfaces and fourth and fifth through holes each extending through said front and rear surfaces thereof, a third opening being open through the top, bottom and end surfaces of said third frame member;
   an elongate side fixture positioned in said second opening and having a base and two legs, said base having a sixth through hole and abutting said rear surface of said first frame member with said legs extending away from said rear surface of said first frame member, an upwardly open first recess and seventh through hole each extending in both said legs of said side fixture;
   an elongate opening fixture partially positioned in said first opening and having a base, two legs, eighth and ninth through holes each extending through said legs of said opening fixture, and an upwardly open recess positioned in both said legs in a portion of said opening fixture extending beyond one said side surface of said first frame member, said first, sixth and eighth holes being aligned;

a first bolt received in aligned said first, sixth, and eighth holes to fix said side and opening fixtures to said first frame member;

a second bolt received in said second hole and slideable into said first recess with said second opening receiving said side fixture as said second frame member is joined to and extends outwardly from said rear surface of said first frame member;

a third bolt thereafter received in aligned said third and seventh holes to fix said second frame member to said side fixture;

a fourth bolt received in said fourth hole and slides into said second recess with said third opening receiving said outward portion of said opening fixture as said third frame member is joined to and extends outwardly from said one side surface of said first frame member; and a fifth bolt thereafter received in aligned said fifth and ninth holes to fix said third frame member to said opening fixture.

2. The frame assembly according to claim 1, wherein said first, second and third frame members each comprise two elongate side-by-side substructures separated by a gap that respectively defines said first, second and third openings.

3. The frame assembly according to claim 2, wherein at least one of said substructures has a rectangular cross section that is generally perpendicular to the longitudinal axis and has a short side that is one-third the length of the long side.

4. The frame assembly according to claim 2, wherein said first frame member has a tenth through hole extending through said front and rear surfaces, said opening fixture has an eleventh through hole extending through the legs thereof, said side fixture has a twelfth through hole extending through the base thereof, said tenth, eleventh and twelfth holes being aligned, and a sixth bolt being received in said aligned tenth, eleventh and twelfth holes to further fix said first frame member and said opening and side fixtures together.

5. The frame assembly according to claim 4, wherein said first and tenth holes are on the longitudinal axis of said substructures that comprise said first frame member.

6. The frame assembly according to claim 4, wherein said seventh and twelfth holes are on the longitudinal axis of said base of said side fixture.

7. The frame assembly according to claim 2, wherein said second and third holes are laterally spaced equidistant from the longitudinal axis of said substructures that comprise said second frame member adjacent one end thereof.

8. The frame assembly according to claim 2, wherein said fourth and fifth holes are laterally spaced equidistant from the longitudinal axis of said substructures that comprise said third frame member adjacent one end thereof.

9. The frame assembly according to claim 1, wherein said first, second and third frame members extend in separate orthogonal directions.

10. The frame assembly according to claim 1, wherein said opening fixture has a second portion extending beyond a second side surface of said first frame member diametrically opposite the first-mentioned portion and includes a second upwardly open recess in said second portion, and a horizontal fourth frame member that is a mirror image of said third frame portion and is connected to said second portion of said opening fixture.

11. The frame assembly according to claim 1, wherein both said side and opening fixtures have a substantially U-shape in lateral cross section.

12. A method for joining frame members, comprising the steps of:

standing elongate first and second frame members side-by-side and spaced from each to create an opening therebetween, fixing an opening fixture in the opening between the first and second frame members and thereby fixing the first and second frame members together, fixing a side fixture on an outer surface of the second frame member remote from the first frame member, tacking third and fourth elongate frame members together with a first bolt with the third and fourth frame members being spaced from each other to create an opening therebetween, sliding the joined third and fourth frame members over the side fixture with the side fixture being received in the opening between the third and fourth frame members so that the portion of the bolt in the opening therebetween is received in an upwardly open recess in said side fixture thereby initially securing the third and fourth frame members to the side fixture so that the third and fourth frame members extend outwardly from the second frame member, after the bolt is received in the recess in the side fixture, thereafter fixing the first and second frame members, the side fixture, and third and fourth frame members together, tacking fifth and sixth elongate frame members together with a second bolt with the fifth and sixth frame members being spaced from each other to create an opening therebetween, sliding the joined fifth and sixth frame members over the opening fixture with the opening fixture being received in the opening between the fifth and sixth frame members so that the bolt in the opening therebetween is received in an upwardly open recess in the opening fixture thereby initially securing the fifth and sixth frame members to the opening fixture so that the fifth and sixth frame members extend sideward from the first and second frame members, and after the bolt is received in the recess of the opening fixture, fixing the fifth and sixth frame members to the opening fixture so as to create a fixed final assembly of joined frame members.

13. The method according to claim 12, wherein the step of fixing the third and fourth frame members to the side fixture includes inserting a bolt through the third and fourth frame members and side fixture generally parallel to the bolt in the recess of the side fixture.

14. The method according to claim 12, wherein the step of fixing the fifth and sixth frame members to the opening fixture includes inserting a bolt through the fifth and sixth frame members and opening fixture generally parallel to the bolt in the recess of the opening fixture.

15. A frame assembly, comprising:

a column defined by two side-by-side elongate slats, which are spaced from each other to create a space therebetween, and an elongate fastener joining the two slats adjacent one end thereof; and a U-shaped bracket received in said space of said column and including a bight plate and leg plates extending from said bight plate, said leg plates including aligned holes through which said elongate fastener fixes said bracket in said space, said leg plates including a portion which extends sidewardly beyond said column and has an upwardly open recess.

16. The frame assembly according to claim 15, wherein a horizontal frame member is defined by two side-by-side elongate slats, which are spaced from one another to create a space therebetween, and an elongate fastener joining the two slats defining said horizontal frame member and having a central portion exposed in said space in said horizontal frame member, said central portion of said fastener being received in the upwardly open end of said recess in said leg plates and resting on the closed downward end of said recess thereby joining the horizontal frame member to said column so that said horizontal frame member extends outwardly from said column.

17. The frame assembly according to claim 16, wherein said slats of said horizontal frame member and said portion of said leg plates have aligned holes, and said horizontal frame member includes a second elongate fastener which extends through said aligned holes in said horizontal frame member and said leg plates and fixes said horizontal frame member to said bracket, whereby said central portion of said first-mentioned fastener of said horizontal frame member is prevented from sliding upwardly out of said recess.

18. The frame assembly according to claim 15, wherein said elongate fastener fixes a second U-shaped bracket to the outside surface of one said slat, said bracket including a bight plate abutting said outside surface of said one slat and leg plates extending outwardly from said bight plate and having an upwardly open recess.

19. The frame assembly according to claim 18, wherein a horizontal member is defined by two side-by-side elongate slats, which are spaced from on another to create a space therebetween, and an elongate fastener joining the two slats defining said horizontal frame member and having a central portion exposed in said space in said horizontal frame member, said central portion of said fastener being received in the upwardly open end of said recess in said second bracket leg plates and resting on the closed downward end of said recess thereby joining the horizontal frame member to said column so that said horizontal frame member extends outwardly from said column.

20. The frame assembly according to claim 19, wherein said slats of said horizontal frame member and said second bracket leg plates have aligned holes, and said horizontal frame member includes a second elongate fastener which extends through said aligned holes in said slats of said horizontal frame member and said leg plates and fixes said horizontal frame member to said second bracket, whereby said central portion of said first-mentioned fastener of said horizontal frame member is prevented from sliding upwardly out of said recess.

\* \* \* \* \*